Figure 1:
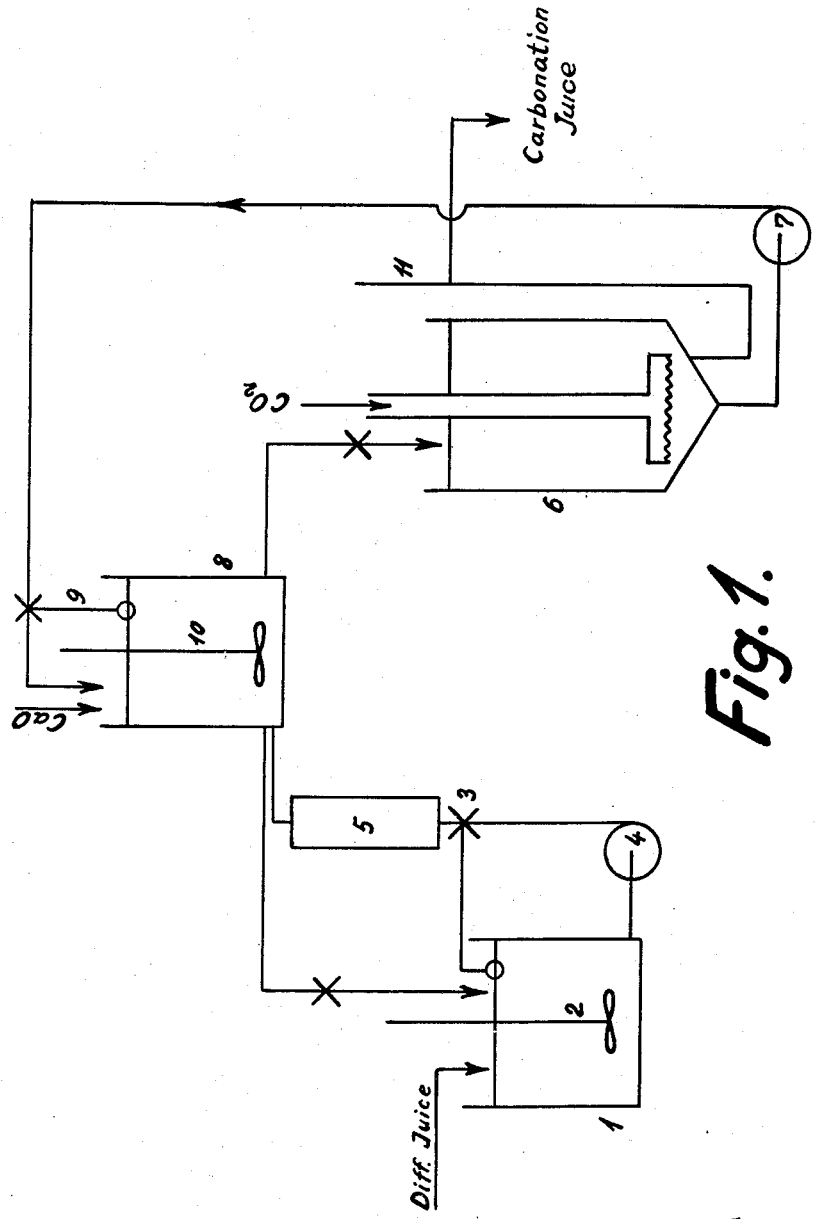

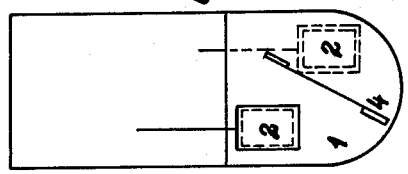
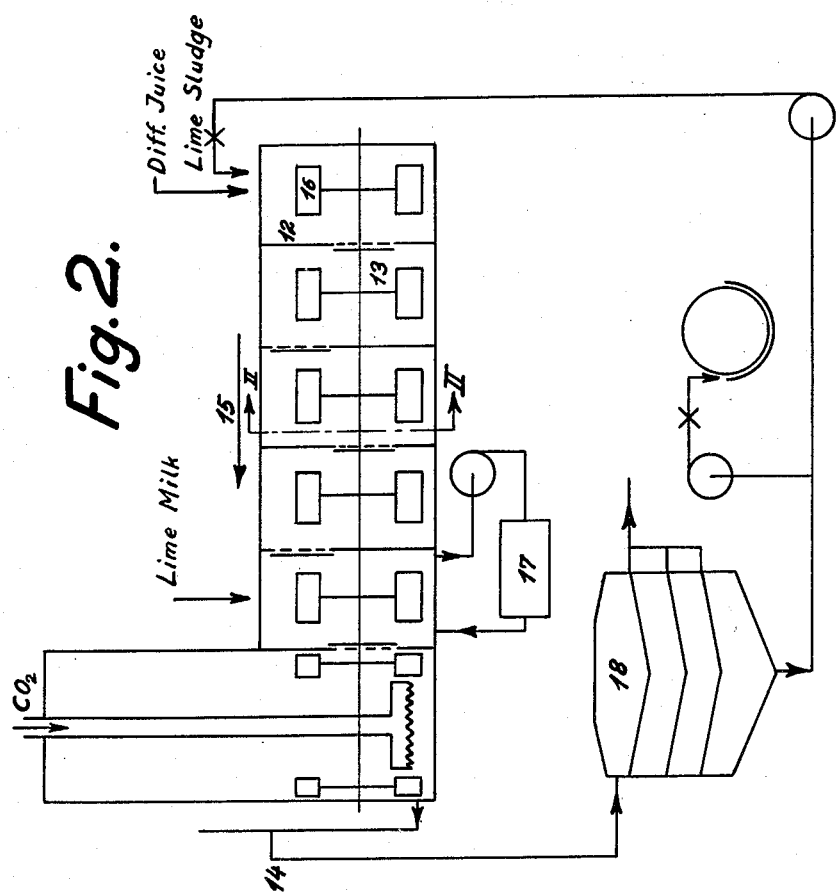

United States Patent Office 2,697,049
Patented Dec. 14, 1954

2,697,049

LIME-CARBONATION METHOD OF REFINING SUGAR SOLUTIONS

Arne Vigand Brieghel-Müller, Gentofte, Denmark

Application June 3, 1950, Serial No. 165,912

Claims priority, application Sweden June 3, 1949

9 Claims. (Cl. 127—50)

The present invention relates to a method for refining diffusion juice or other colloidal liquids occurring in the production of sugar e. g. waste water from leached beet cuts.

The diffusion juice or crude juice appearing when leaching beet cuts contains various impurities, especially pectin and albumen, which must be removed before the juice can be subjected to further treatment. Such removal is effected, according to the invention, according to hitherto known methods by admixture of calcium hydroxide in the form of lime milk or dry lime (wet and dry liming respectively) which substances are called lime in the following. The impurities are precipitated in this manner in colloidal form, and after adding carbonic acid, e. g. in the form of lime-kiln gas (carbonation) they are removed together with the particles of calcium carbonate formed in the carbonation by filtration. Seeing that the precipitated impurities will thus appear in voluminous gelatinous form in which they render the filtration difficult, liming requires a considerable surplus of lime with the result that the filter cake formed through the filtration will consist mainly of the easily filtered calcium carbonate in which the precipitated impurities are found mechanically mixed.

In the carbonation not all the lime can be removed in one operation seeing that part of the impurities precipitated in the liming would be resolved (over-carbonation). After the filtration following the first carbonation the juice is consequently subjected to a second carbonation, in which the remaining lime is removed.

In order to obtain an easier filtration and consequently a possibility for a saving of lime, various methods have been employed which according to experience have proved more or less advantageous. Some of these methods aim at starting the liming process with a cautious successive admixture of lime milk (preliming).

In other methods the lime milk is added under simultaneous admixture of carbonic acid (defeco-carbonation) often in continuous working in which manner it is, also possible to obtain a more gentle influence on the colloids of the juice. Finally methods have been proposed aiming at an increase of the formed calcium carbonate particles. Of the latter methods should be mentioned in the first place those in which the supply of carbonic acid is undertaken continuously thus rendering it possible for the new calcium carbonate to a high degree to contribute towards an increased formation of the earlier formed particles. In other methods (carbonation juice return) a similar effect is aimed at by adding fully carbonated juice during the liming.

Common to all these known methods is that the pectin substances and other impurities are brought to coagulate through the admixture of lime. According to circumstances this coagulation takes place either before or simultaneous with the precipitation of the calcium carbonate or in the presence of earlier precipitated calcium carbonate. The difference between the methods lies partly in the different degree in which the coagulation is bound to the calcium carbonate particles, partly in the different size of the same which put together will give varying sedimentation and filtration properties.

The invention is based on the observation that it is possible to obtain an essentially better filtration when the process is conducted in such a manner that—as opposed to earlier methods—there is at no stage of the juice refining any coagulation of the pectin substances and the other impurities in which manner a better sedimentation property is obtained, a smaller residue volume and a much improved filtration capacity.

The elimination of a coagulation of the impurities may according to the invention be obtained in the manner that before the liming and carbonation proper the diffusion juice is stabilized by being given successively or suddenly an alkalinity of 0.01–0.05% CaO, preferably 0.02% CaO by means of a liming means the alkalinity of which does not exceed 0.15% CaO. The effect of said stabilization, according to the invention, is felt in two ways:

A. The stabilized diffusion juice may receive further treatment through the so-called defeco-carbonation, i. e. it may be treated in a reaction vessel under simultaneous admixture of lime and carbonic acid without precipitation of the impurities in colloidal form and consequent obstruction of the subsequent sedimentation and filtration, such precipitation being normal in the ordinary treatment of diffusion juice by defeco-carbonation. The effect thus obtained through the stabilization is characterized in that the primary particles formed during the stabilization are able directly to be adsorbed on calcium carbonate particles present in or in statu nascendi in the reaction vessel.

B. The stabilized diffusion juice may be further treated by being subjected to preliming in known manner but under simultaneous or previous admixture of sludge containing calcium carbonate, preferably sludge precipitated during the carbonation and thereafter limed and carbonated, alternatively under simultaneous admixture of lime.

The alkalization to an alkalinity between 0.01 and 0.05% CaO will give the result that the reaction product formed at the subsequent liming between impurities of the juice and the added calcium hydroxide will be present in such a form that it is easily adsorbed by the calcium carbonate particles in the sludge containing calcium carbonate and added at the preliming or earlier.

When the thus formed adsoprtion complex during or after the admixture of further quantities of lime constitutes part of a continuously working carbonation, the surface of the particles will be covered by the newly formed calcium carbonate in finely grained form in which manner an activity of the sludge to be led back for preliming is obtained. In this maner it is obtained that the colloidal impurities without jellification are gradually incorporated in the formed conglomerates of calcium carbonate.

The stabilization of the diffusion juice may, according to the invention, preferably be brought about by leading back part of the prelimed diffusion juice ordinarily having an alkalinity of about 0.15% CaO.

The stabilization may, however, also take place by adding sludge juice from the first carbonation mixed with lime to obtain the desired alkalinity. In the latter case is further obtained that the juice receives a greater or smaller amount of sludge necessary for the adsorption. The sludge may furthermore be supplied in the form of residual compound from a thickening device whereby the circulating liquid quantities are reduced considerably.

The quantity of sludge led back must of course be so great that there is a sufficient surface available for the adsorption effect, i. e. normally so much that it corresponds to about 1% CaO in the form of $CaCO_3$.

The preliming is carried out most advantageously by leading back the fully limed juice seeing that the use of lime milk as was the case in the stabilization may bring about detrimental local effects.

It should be observed that the reaction complexes formed during the preliming are exposed at the subsequent liming to a certain degree of peptization and consequently a too energetic treatment with lime will bring about a reduction of the attained effect. This will for instance be the case if a lengthy cold main liming is employed.

The method according to the invention may for instance be carried out in a plant of the kind diagrammatically shown in the drawing in which Fig. 1 is an embodiment of a plant for carrying out the method according to the invention, Fig. 2 another embodiment of a plant where the stabilization, the liming, and the carbonation take place in one and the same container, and Fig. 3 a section along the line II—II in Fig. 2.

In the embodiment of Figure 1 there is shown an apparatus arrangement which comprises a container 1 provided with a stirring device 2 so that the diffusion juice is mixed therein with juice coming from a container 8 provided with a stirring device 10 whereby there is effected a mixing in that tank of juice supplied from tank 1 with carbonated juice and with milk of lime to an alkalinity of about 0.15% CaO. The mixture from tank 1 is pumped by a pump 4 through a float valve 3 and a preheater 5 to the container 8 in which it is limed as mentioned and from where it passes to a carbonation chamber 6, from where a pump 7 sends part of the carbonated juice with precipitate back to the container 8 through a float valve 9 while the remaining amount of juice through an overflow 11 passes on for further treatment in the production.

In the plant according to Fig. 2 where the stabilization, the liming, and the carbonation take place in one and the same container, same is provided with partition walls 12 in which there are adjustable shutters 13. The juice level in the system is decided by an adjustable overflow 14, and the incoming diffusion juice passes the system in the main direction indicated in the drawing by the arrow 15. By means of a stirring device 16 a turbulent current is brought about, an inner circulation being thereby obtained among the chambers limited by the partition walls. The extent of the circulation may optionally be adjusted by means of the shutters, alternatively by a change in the speed of rotation of the stirring device.

If it is found desirable for a diffusion juice with an initial alkinity of minus 0.02% CaO to obtain the following alkalinity division: 0–0.02–0.05–0.1–0.2–0.1, using as liming admixture 0.05 part of a lime milk with 20% CaO, the circulating amount of juice among the several chambers must be as follows: 1–1.3–1.4–1.2–7.7 times the incoming amount of juice. The system is kept heated at a desired temperature through an outer circulation through the preheating system 17.

In this manner it is obtained that the increase of the alkalinity as well as the increase of the temperature and the supply of the calcium carbonate formed in the carbonation chamber take place successively.

In case it is desired to get a higher maximum alkalinity in the system the amounts of juice circulating among the chambers must be reduced which may have the result that the amount of calcium carbonate led back will be insufficient. In this case the amount of calcium carbonate may be increased by the residual compound from the bottom of the thickening device 18, part of this residual compound being supplied to the system together with the diffusion juice.

The system may of course be varied within the principles on which the invention is based so as to suit local requirements. It should be especially mentioned that provided the produced diffusion juice is subjected to measuring it is advantageous to use the measuring vessels after the measuring has been finished for a further ad mixture of the necessary quantity of the limed mixture of stabilized juice and carbonation juice. Seeing that the mixture will thus appear discontinuously it is advisable after the measuring vessels to insert an equalization container.

The methods aimed at by the invention and described above and the advantages obtained through these methods are also of importance in the refining of other liquids appearing during the production of sugar and containing colloidal impurities.

I claim:

1. The method of subjecting raw sugar solution to continuous purification treatment by the addition of lime in a quantity sufficient to precipitate impurities adapted to be in a state of gelatinous coagulation and by reaction of $CO_2$ with lime in the juice for rendering the impurity precipitate settleable by way of the $CaCO_3$ reaction product; characterized by conditioning the juice prior to said lime addition in a manner discouraging the juice impurities from precipitating in a coagulated gelatinous hard-to-filter state while encouraging the precipitate to assume non-gelatinous easy-to-filter characteristics, which comprises stabilizing the raw sugar solution by preliminarily adding thereto a liming agent having an alkalinity of substantially not in excess of 0.15% CaO at a rate whereby the juice is brought to an alkalinity of 0.01% CaO to 0.05% CaO whereafter the impurity precipitate occurring by the following liming is rendered with $CaCO_3$ precipitate as an easy-to-filter substantially granular aggregate.

2. The method according to claim 1, in which said liming agent is added at a rate producing an alkalinity of substantially 0.02% CaO.

3. The method according to claim 1, in which said liming agent comprises precipitate containing 1st carbonation juice.

4. The method according to claim 1, in which said liming agent comprises precipitate-freed 1st carbonation juice.

5. The method according to claim 1, in which said liming agent comprises 1st carbonation juice with liming agent added thereto up to an alkalinity of 0.15% CaO.

6. The method according to claim 1, in which said liming agent comprises limed juice.

7. The method according to claim 1, in which said liming is effected in the presence of sediment from the carbonated juice.

8. The method of subjecting a solution of raw sugar juice to continuous purification treatment by the addition of lime in a quantity sufficient to precipitate impurities adapted to be in a state of gelatinous coagulation and by reaction of $CO_2$ with lime in the juice for rendering the impurity precipitate settleable by way of the $CaCO_3$ reaction product, which comprises maintaining a first body of juice under agitation, maintaining a second body of juice under agitation, feeding fresh juice to said first body, feeding to said second body carbonated juice containing precipitate and a liming agent to effect pre-liming of the juice in said second body, while feeding juice from said first body to said second body and feeding pre-limed juice having an alkalinity of substantially not in excess of 0.15 CaO from said second body to said first body at a rate whereby the juice in said first body is brought to an alkalinity of 0.01% CaO to 0.05% CaO, whereafter the impurity precipitate occurring by the following liming is rendered with the $CaCO_3$ precipitate as an easy-to-filter substantially granular aggregate.

9. The method of subjecting a solution of raw sugar juice to continuous purification treatment by the addition of lime in a quantity sufficient to precipitate impurities adapted to be in a state of gelatinous coagulation and by reaction of $CO_2$ with lime in the juice for rendering the impurity precipitate settleable by way of the $CaCO_3$ reaction product, which comprises maintaining a confined body of juice divided into a series of hydraulically communicating zones, feeding juice as well as carbonate precipitate to a zone adjacent one end of the body while emitting treated juice from a zone at the other end whereby there is a flow of juice sequentially through the zones, supplying liming reagent to the body adjacent its emission end, swirlingly agitating juice in each zone, intercepting and diverting a quantity of swirling juice in each zone except the juice-feeding zone to deliver such diverted quantity into the next preceding zone there to admix with juice therein, such diverted quantity carrying some of the reagent, controlling such diverted quantities so that the concentration of the reagent in the juice in the zones is greatest in the zone of juice emission and is least in the zone of juice feeding while the concentrations in the zones therebetween diminish from zone to zone from greatest to least, and furthermore so that the juice at the juice-feeding end of said body is brought to an alkalinity of 0.01% CaO to 0.05% CaO, whereafter the impurity precipitate occurring by the following liming is rendered with the $CaCO_3$ precipitate as an easy-to-filter substantially granular aggregate.

References Cited in the file of this patent

UNITED STATES PATENTS

| Number | Name | Date |
|---|---|---|
| 1,755,165 | Bull | Apr. 22, 1930 |

(Other references on following page)

UNITED STATES PATENTS

| Number | Name | Date |
|---|---|---|
| 1,868,472 | Ramsey | July 19, 1932 |
| 2,143,594 | Cowan | Jan. 10, 1939 |
| 2,164,186 | Brown | June 27, 1939 |
| 2,547,298 | Wiklund | Apr. 3, 1951 |
| 2,557,800 | Seailles | June 19, 1951 |

OTHER REFERENCES

Sugar Industry Abstracts (pub. by Tate & Lyle, Kent, England): vol. 12, No. 4, April 1950, p. 66, item 265; vol. 12, No. 7, July 1950, p. 130, item 501.

Sugar Industry Abstracts, March 1949, vol. 11, No. 3, p. 35.

The Int. Sugar Jour., March 1950, pp. 69–71 (Wiklund et al.).

Sugar, May 1942, pp. 40 and 41.